(12) United States Patent
Connors et al.

(10) Patent No.: US 7,591,456 B2
(45) Date of Patent: Sep. 22, 2009

(54) MEDIA RE-INGESTION STOPPER

(75) Inventors: William Michael Connors, Lexington, KY (US); Walter Kevin Cousins, Georgetown, KY (US); Stephen Kelly Cunnagin, Lexington, KY (US); John Andrew Schmelz, Lexington, KY (US); Stephen Edward Stewart, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 11/753,020

(22) Filed: May 24, 2007

(65) Prior Publication Data

US 2008/0290580 A1   Nov. 27, 2008

(51) Int. Cl.
*G03G 15/00* (2006.01)
(52) U.S. Cl. .................... 271/3.14; 399/367
(58) Field of Classification Search ............... 271/165, 271/3.14, 118, 121; 399/377, 367
See application file for complete search history.

(56) References Cited

U.S. PATENT DOCUMENTS

| | | | | |
|---|---|---|---|---|
| 4,739,376 A * | 4/1988 | Kanekol | ...... | 355/75 |
| 5,205,550 A * | 4/1993 | Perino | ...... | 271/157 |
| 6,431,541 B2 * | 8/2002 | Kuo et al. | ...... | 271/118 |
| 6,654,586 B2 * | 11/2003 | Lyon et al. | ...... | 399/367 |
| 6,991,227 B2 * | 1/2006 | Kim | ...... | 271/10.12 |
| 7,159,863 B2 * | 1/2007 | Murrell et al. | ...... | 271/157 |
| 7,487,961 B2 * | 2/2009 | Aruga et al. | ...... | 271/145 |
| 2002/0096819 A1 * | 7/2002 | Fukasawa et al. | ...... | 271/121 |
| 2004/0022452 A1 * | 2/2004 | McCoy | ...... | 382/284 |
| 2005/0184449 A1 * | 8/2005 | Morimoto et al. | ...... | 271/118 |

\* cited by examiner

*Primary Examiner*—Patrick H Mackey
*Assistant Examiner*—Jeremy Severson
(74) *Attorney, Agent, or Firm*—Middleton Reutlinger

(57) ABSTRACT

An auto-document feeder re-ingestion stop includes an auto-document feeder having a lower input tray and an upper output tray, the upper output tray having a length which is shorter than the length of input tray so that exiting or exited media depends onto the input tray, a flexible stopper depending from the upper output tray and inhibiting the exited media from being re-ingested by paper-to-paper friction during feeding of media in the input tray.

20 Claims, 8 Drawing Sheets

MEDIA RE-INGESTION STOPPER

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to media feed mechanisms. More particularly, the present invention relates to automatic document feeder (ADF) mechanisms which inhibit re-feeding or re-ingestion of media expelled from the ADF exit or output.

2. Description of the Related Art

All-in-one devices or multi-function peripherals utilize an auto-document feed system for feeding media through scanning and printing portions of the device. Typically, the media being fed is positioned in an input tray for feeding through the scanner or printer. After the scanning or printing process occurs, the media is positioned on an exit tray. Typically, both the input tray and the exit tray can be large and extend outwardly from the device housing which render packaging and shipping difficult and increases the profile of the device. Typically, to alleviate shipping difficulties, a manufacturer has the end user attach such tray during setup.

Heretofore, removal of the exit tray has not been given serious thought because removal of the exit tray has a resultant problem. When the exit tray is removed or decreased in size so not to support the entire length of media, the exiting media may depend from the output tray on to the input media tray. As the input media is fed, the output media may be re-fed or re-ingested by the ADF due to paper-to-paper friction. This is considered a device failure.

SUMMARY OF THE INVENTION

An auto-document feeder re-ingestion stopper comprises an auto-document feeder having a lower input tray and an upper output tray, the upper output tray having a length which is shorter than the length of input tray so that exiting media depends onto the input tray, a flexible stopper depending from the upper output tray and inhibiting media from being re-ingested by paper-to-paper media during feeding of media in the input tray. The stopper is formed of an elastomeric material. The stopper is substantially T-shaped. The stopper has a flexibility which allows media to be inserted in the input tray but inhibits frictional pulling of exit media into a feeding area along the input tray. The auto-document feeder feeds media to a scanner. The auto-document feeder feeds media to a printer.

An auto-document feeder re-ingestion stop comprises an auto-document feeder having an input tray and an output tray, a stop device depending from the output tray, the exit tray being substantially shorter than a media sheet, such that the media extends beyond the exit tray upon exiting and engages one of the media input tray or the media on the input tray, wherein the media exits from the auto-document feeder, is pulled toward a feeding area and engages the stop to inhibit the exited media from re-ingestion into the auto-document feeder. The stop depends substantially vertically from the exit tray. The auto-document feeder feeds a scanner. The auto-document feeder feeds a printer. The stop is formed of elastomeric material.

An auto-document feeder re-ingestion stop comprises an auto-document feeder having an input tray and an output tray, the output tray having a length in a media feed direction which is less than the length of the input tray, a re-ingestion stopper depending from the exit tray and extending in front of a feeding area; and, the re-ingestion stopper received by a cavity on the tray and inhibiting re-ingestion of media. The stop being formed of a flexible elastomeric material. The stop is flexible enough to deflect when media is inserted for initial feeding and stiff enough to inhibit re-ingestion of exited media falling from the exit tray to the input tray. The re-ingestion stopper is substantially T-shaped. The auto-document feeder stop further comprises a gap disposed between the re-ingestion stopper and the input tray wherein media is positioned on the tray for an initial media feed. The auto-document feeder has a housing and the exit tray is contained within the housing. The exit tray is shorter than media passing through said ADF.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
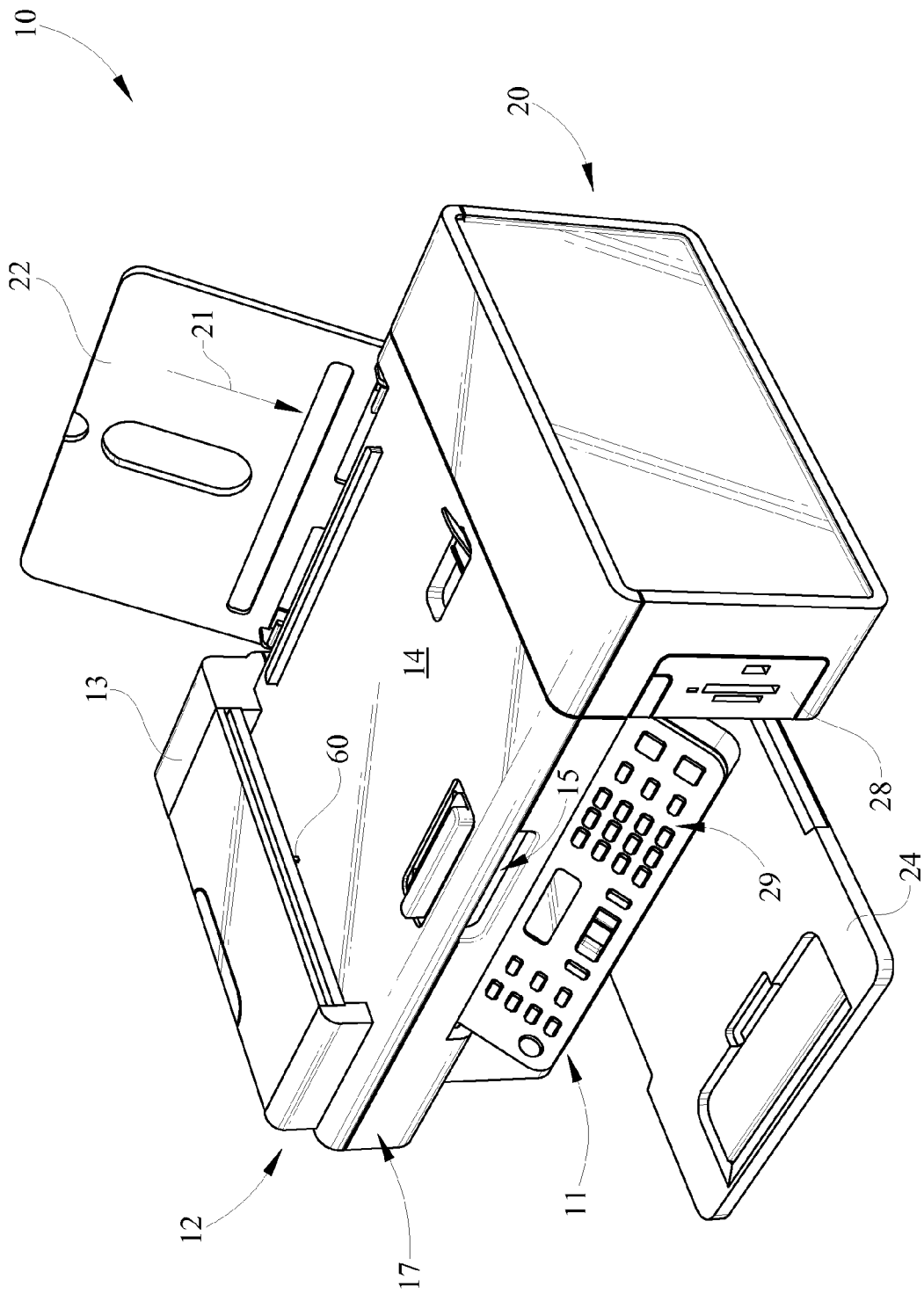
FIG. 1 is a perspective view of a multi-function device including an ADF.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

The term image as used herein encompasses any printed or digital form of text, graphic, or combination thereof. The term output as used herein encompasses output from any printing device such as color and black-and-white copiers, color and black-and-white printers, scanning device or so-called "all-in-one devices" or "multi-function peripherals" that incorporate multiple functions such as scanning, copying, and printing capabilities in one device. Such printing devices may utilize ink jet, dot matrix, dye sublimation, laser, and any other suitable print formats. The term button as used herein means any component, whether a physical component or graphic user interface icon, that is engaged to initiate output. The term ADF as used herein means auto-document feeder and may be utilized on printers, copiers, scanners, multi-function peripheral devices and other such devices utilizing automated media feeding.

Referring now in detail to the drawings, wherein like numerals indicate like elements throughout the several views, there are shown in FIGS. 1-8 various aspects of a media re-ingestion stopper 60. The media re-ingestion stopper 60 inhibits processed media from being re-ingested in a media input area. The media re-ingestion stopper 60 will be described in the context of a scanner. Nevertheless, it should be understood that it is equally applicable to other machines which utilize media sheet feeding mechanisms such as copiers, fax machines, auto-document feeding scanner devices or other mechanisms utilizing such sheet feeding devices for feeding both light and heavy weight media.

Referring initially to FIG. 1, an all-in-one or multi-function peripheral device 10 is shown having an upper scanner portion 12 and a lower printer portion 20, represented generally by the housing. The multi-function peripheral device 10 is shown and described herein, however one of ordinary skill in the art will understand upon reading of the instant specification that the present invention may be utilized with a stand alone printer, copier, scanner or other peripheral device utilizing a media feed system. The peripheral device 10 further comprises a control panel 11 having a plurality of buttons 29 for making command selections or correction of error conditions. The control panel 11 may include a graphics display to provide a user with menus, choices or errors occurring with the system.

The printer portion 20 includes two media trays for media throughput. Extending from the rear of the printer portion 20 is an input tray 22 for retaining media prior to printing. Extending from the front of the printer portion 20 is an output tray 24 for retaining media after a print process. The input and output trays 22, 24 of the printer portion 20 define start and end positions respectively, of a media feedpath 21 within the printer portion 20. The media trays 22, 24 each retain a preselected number of sheets defining a stack of media (not shown) which will vary in thickness based on the media type. One skilled in the art will understand that the media feedpath 21 illustrated is an L-shaped media feedpath due to the depicted configuration. However, it is within the scope of the present invention that the C-shaped media feedpath configuration as will be shown further herein.

Still referring to FIG. 1, a memory card reader 28 is depicted adjacent the control panel 11. The memory card reader 28 receives various types of memory cards which may store picture files for printing or other manipulation by the device 10. Such as Secure Digital (SD) cards, micro SD cards, memory stick devices from Sony and the like.

The printer portion 20 may include various types of printing mechanisms including dye-sublimation, dot-matrix, inkjet or laser printing. For ease of description, the exemplary printer portion 20 may be an inkjet printing device although such description should not be considered limiting. The printer portion 20 of the exemplary device 10 includes various components generally described but not shown. The printer portion 20 includes a carriage having a position for placement of at least one print cartridge wherein two print cartridges may be, for instance, a color cartridge for photos and a black cartridge for text or other monochrome printing. As one skilled in the art will recognize, the color cartridge may include three inks, i.e., cyan, magenta and yellow inks. Alternatively, in lower cost machines, a single cartridge may be utilized wherein the three inks, i.e., cyan, magenta and yellow inks are simultaneously utilized to provide the black for text printing or for photo printing. As a further alternative, a single black color cartridge may be used. During advancement media moves from the input tray 22 to the output tray 24 in a substantially L-shaped path along the media feedpath 21 beneath the carriage and cartridges. As the media moves into a printing zone beneath the at least one ink cartridge, the media moves in a first Y-direction (North-South) along feedpath 21 and the carriage and the cartridges move in a second X-direction (East-West) which is transverse to the movement of the media M. During this movement, ink is selectively ejected onto the media to form an image.

Referring still to FIG. 1, the scanner portion 12 generally includes an ADF scanner 13, a scanner bed 17 and a lid 14 which is hingedly connected to the scanner bed 17. Beneath the lid 14 and within the scanner bed 17 may be a transparent platen (not shown) for placement and support of target or original documents for manual scanning. Along a front edge of the lid 14 is a handle 15 for opening of the lid 14 and placement of the target document on the transparent platen (not shown). Such scanner bed 17 is preferable for photos or other such media not suitable for scanning, however it should be understood that any media may be utilized with the present invention if it may be scanned. Adjacent the lid 14 is an exemplary duplexing ADF scanner 13 which automatically feeds and scans stacks of documents which are normally sized, e.g. letter, legal, or A4, and suited for automatic feeding. The ADF scanner 13 is a bottom feed device meaning it feeds media from bottom of the media input stack (not shown). The lid 14 also functions as an input tray area to retain media sheets being feed into the ADF.

Figure 2:
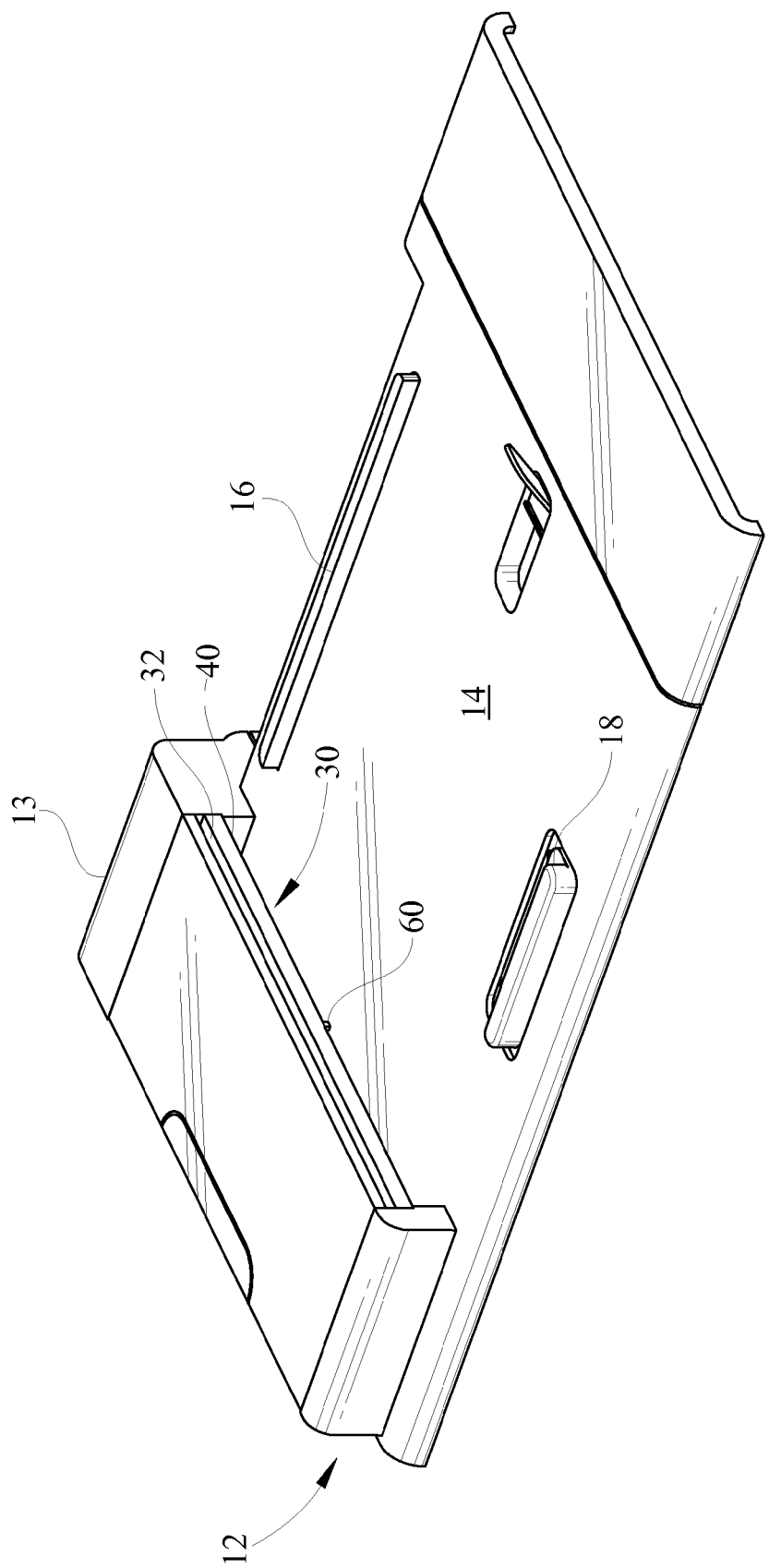
FIG. 2 is a perspective view of an upper portion of the scanner portion of the multi-function device of FIG. 1.

Referring now to FIG. 2, the upper portion of the device 10 is depicted in perspective view. Specifically, the scanner 12 is shown having the ADF 13 which receives media from the upper surface of the lid/input tray 14. The ADF 13 is a C-path device with a lower media input 30 and an upper media output 32. The lid or input tray 14 comprises a stationary edge alignment rail 16 and a movable alignment rail 18. The lid 14 has a notch wherein the movable alignment rail 18 can move toward or away from the stationary edge alignment rail 16 for aligning media of different widths. The media positioned on the lid 14 moves into the input 30 which is the lower opening defined in the ADF 13. As the media is input through the lower opening 30, the media moves over a window (not shown) within the ADF 13 and upward through an arcuate feedpath of about 180 degrees to the media output 32. The opening for the media input 30 is larger than the media output 32 so that a plurality of documents may be disposed within the input 30 on the lid 14. Thus, a media stack may be located therein and the media input 30 is sized to receive a stack of media of a pre-selected thickness. However, the openings 30, 32 may be similarly sized. The media input 30 and the media output 32 are separated and thus particularly defined by an ADF exit tray 40. The exit tray 40 is shorter in length in the media feed direction than the lid 14 but parallel to the lid 14. Accordingly, the media exiting the ADF 13 will extend from the output 32 and exit tray 40 so that the leading edge of the scanned media sheets may lay upon the lid 14 or input media sheets positioned in the input tray 14 for scanning. This is shown in the side view of FIG. 6.

Referring still to FIG. 2, a re-ingestion stopper 60 depends from the ADF exit tray 40. As previously mentioned, the exit tray 40 has a short length remaining within the profile of the ADF scanner 13 and which is shorter than the media and lid 14. As a result, media exiting the ADF scanner 13 depends on to media on the lid 14 being fed into ADF scanner 13. The re-ingestion stopper 60 inhibits the re-ingestion or re-feeding of media which has already passed through the ADF 13 and which may be pulled into the media input 30 by paper-to-paper friction.

Figure 3:
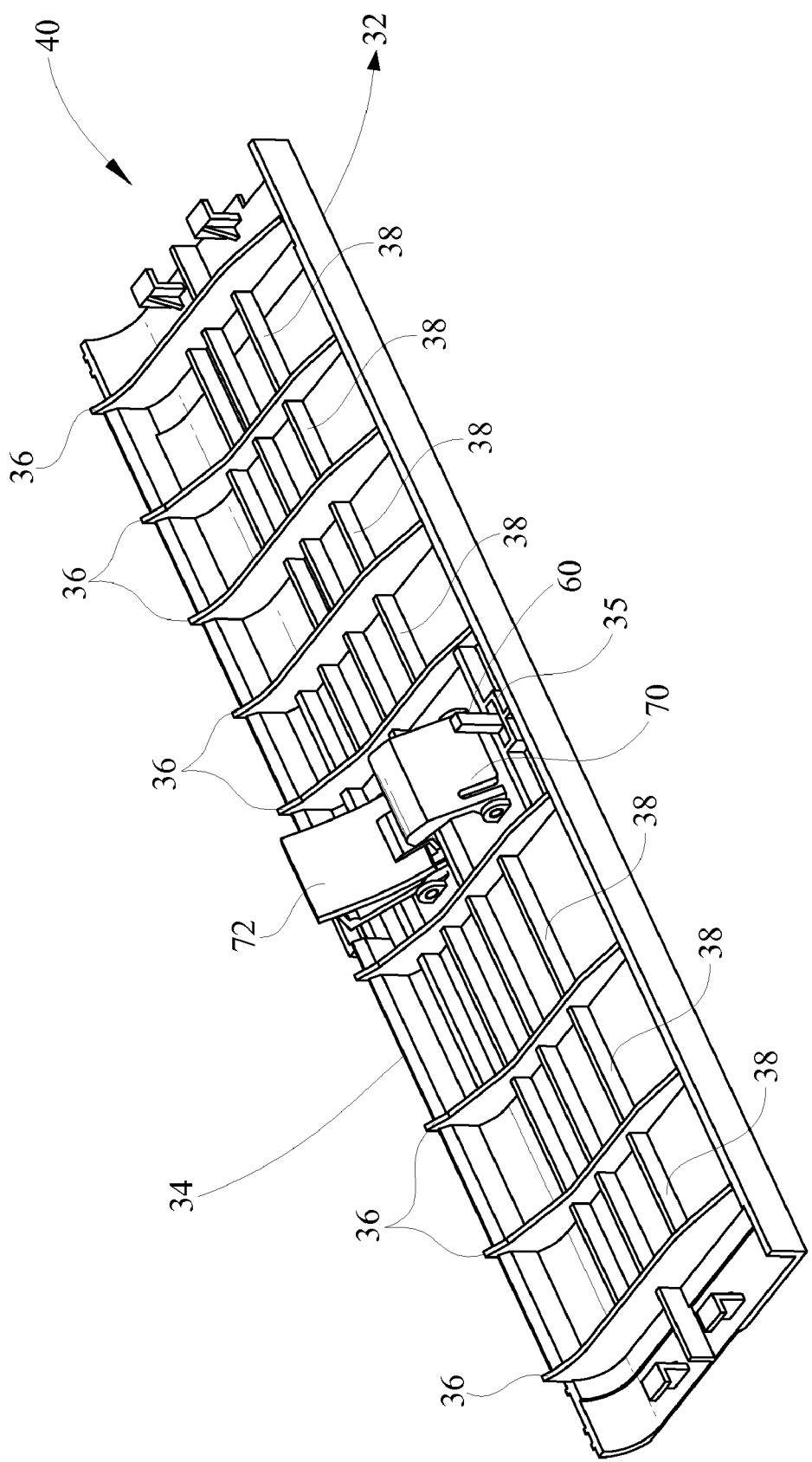
FIG. 3 is a perspective view of the ADF exit tray.

Referring now to FIG. 3, the exit tray 40 is shown turned upside down and removed from the ADF 13. The exit tray 40 is generally rectangular in shape with the long dimension being perpendicular generally to the media feed direction of the ADF 13. The exit tray 40 is generally sized to fit substantially within the profile of the housing defining the ADF scanner 13. The ADF exit tray has a first forward end 32 and a second rearward end 34 with respect to the media feed direction through the ADF 13. The undersurface of the exit tray 40 includes a plurality of media guide ribs 36 extending in a media feed direction. The media guide ribs 36 have a depth which increases when moving from the front portion 32 of the exit tray 40 toward the rear portion 34 of the exit tray 40 in the media feed direction. The increasing thickness of the ribs 36 forces the media downward slightly for scanning before the media turns upward through the ADF 13. Transverse to the media guide ribs 36 are a plurality of stiffening ribs 38 which provide strength to both the ADF tray 40 and the media ribs 36 while maintaining lightweight desirable features.

Centrally positioned in the exit tray 40 is a re-ingestion stopper 60. A mount or holder 35 is located on a lower surface of the ADF exit tray 40. The re-ingestion stopper 60 is positioned within the holder 35 and may be frictionally held, may be held in place by a fixative or by some retaining mechanism of the exit tray 30. As depicted in FIG. 3, the holder 35 is generally rectangular in shape to receive a portion of the stopper 60. However, various shapes may be utilized corresponding to the shape of the stopper 60 so that the re-ingestion stopper 60 may be received therein. The holder 35 is shown integrally formed in the lower portion of the exit tray 40. However, alternate designs may be used wherein the holder 35 is attached to the exit tray 40.

Depending from the lower surface of the exit tray 40 is a first media stack biasing arm 70. The first arm 70 is pivotally connected to the exit tray 40 and is biased by a biasing element (not shown). Moving toward the rear of the exit tray 40, a second biasing arm 72 is also pivotally connected to the exit tray 40. The second biasing arm 72 is made of a flexible elastomer and is biased by a biasing element (not shown). The second biasing arm 72 is at a shallower angle than the first biasing arm. Whereas the first biasing arm places a down force on a media stack in the input tray 14, the second biasing arm 72 holds back sheets in the tray 14 other than the bottom most sheet of media since the ADF 13 is a bottom feed system.

Figure 4:
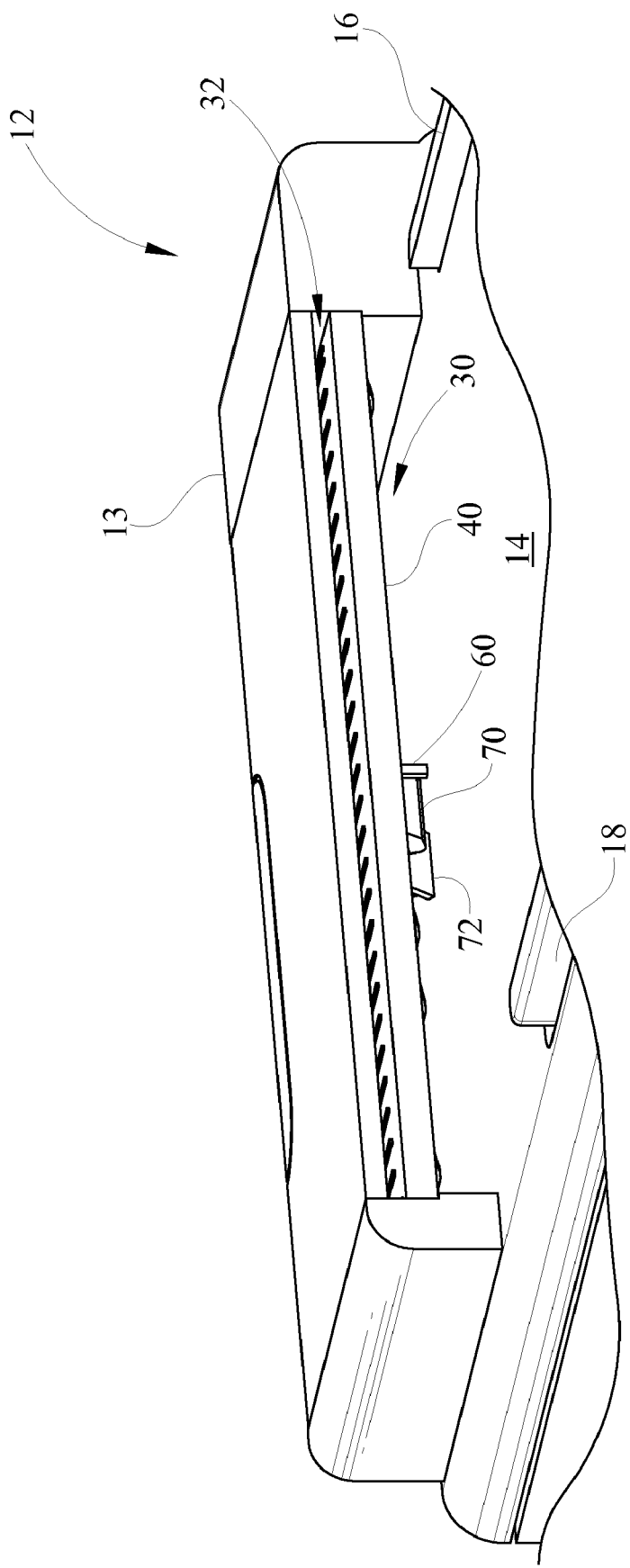
FIG. 4 is a perspective view of the ADF entrance area including the re-ingestion stopper.

Referring now to FIG. 4, a front perspective view of the scanner portion 12 and ADF 13 is shown. In this view, the media input 30 is shown with the exit tray 40 disposed above the media input 30 and further separating the media input 30 from the media output 32. Depending from the exit tray 40 is the re-ingestion stopper 60. The media, which is scanned by the ADF 13 and moves to the exit tray 40, has a length which is substantially longer than the exit tray 40. Accordingly, the exited media extends from the exit tray 40 and at least some portion of the exited media will fall onto the input tray 14 or a media stack thereon. Meanwhile, as the media input stack feeds into the scanner ADF 13, the output media extending beyond the tray 40 may be pulled by friction toward the stopper 60.

Figure 5:
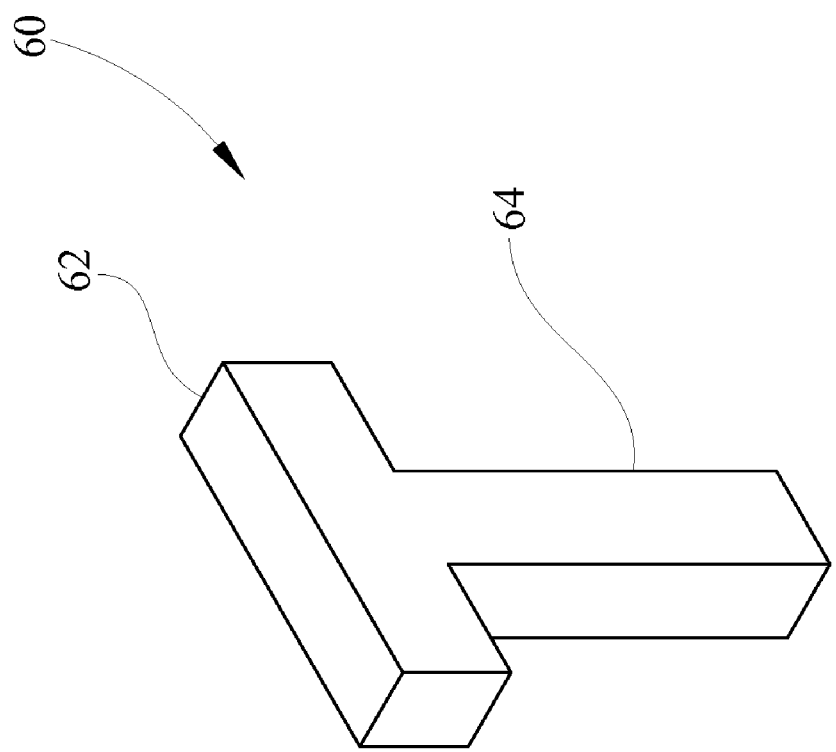
FIG. 5 is a perspective view of the re-ingestion stopper.

Referring now to FIG. 5, the stopper 60 is shown in perspective view. The stopper 60 has an upper portion 62 and a lower portion 64 depending from the upper portion 62. The stopper 60 is generally shown as having a substantially T-shaped form, however, alternative shapes may be utilized and therefore considered within the scope of the present invention. The exemplary upper portion 62 has a width of about 8 millimeters and a height of about 3 millimeters, the exemplary lower portion 64 has a height of about 11.25 millimeters and width of about 2.5 millimeters. The exemplary thickness of the stopper 60 is about 1.85 millimeters. These dimensions are merely exemplary and may vary for accordingly. The upper portion 62 is received within the holder 35 of the exit tray 30. The upper portion 62 is substantially rectangular in shape with a depth or thickness defining a third dimension measured in the ADF media feed direction. The shape of the upper portion 62 corresponds to the shape of the holder 35 so that the stopper 60 may be held therein. Additionally, a fixative may be positioned either on the upper portion 62, within the holder 35 or the upper portion 62 may be mechanically fixed in the holder 35 so that the stopper 60 does not fall from the ADF exit tray 40. Depending from the upper portion 62, the lower portion 64 is also substantially rectangular in shape with a depth defining a third dimension. Thus, the upper portion 62 and lower portion 64 define a substantially T-shaped stopper. However, it should be understood by one skilled in the art that the shape of the stopper 60 is merely exemplary and that other alternative shapes may be utilized. For example, the stopper 60 may be cylindrical, conical or other shapes. Also, the stopper 60 may have various cross-sectional shapes such as round, oval, square, rectangular, polygonal or other known shapes. It should be understood that the various shapes and or cross-sections have some portion which depends from the tray 40 and engages media which has already been fed through the scanner. The stopper 60 is formed of an elastomeric material which has some flexibility. When media is inserted into the input area 30 and is disposed on the input tray 14, the force of the media being inserted is enough to cause the stopper 60 to bend or flex. However, after the media feeds through the ADF 13, the leading edge of the scanned sheet may be pulled by friction of the sheets in the tray 14 toward the media input area 30. The stopper 60 is stiff enough to inhibit media from being pulled into the input area 30. The flexibility of the stopper 60 is a function of the thickness of the stopper 60 measured in the media feed direction. Thus, as the exited media extending from the media output 32 engages the media in the tray 14, the frictional pull from the media in the tray 14 is not strong enough to deflect the stopper 60 so that the previously scanned and exited media may not be re-ingested or re-fed into the media input 30.

Figure 6:
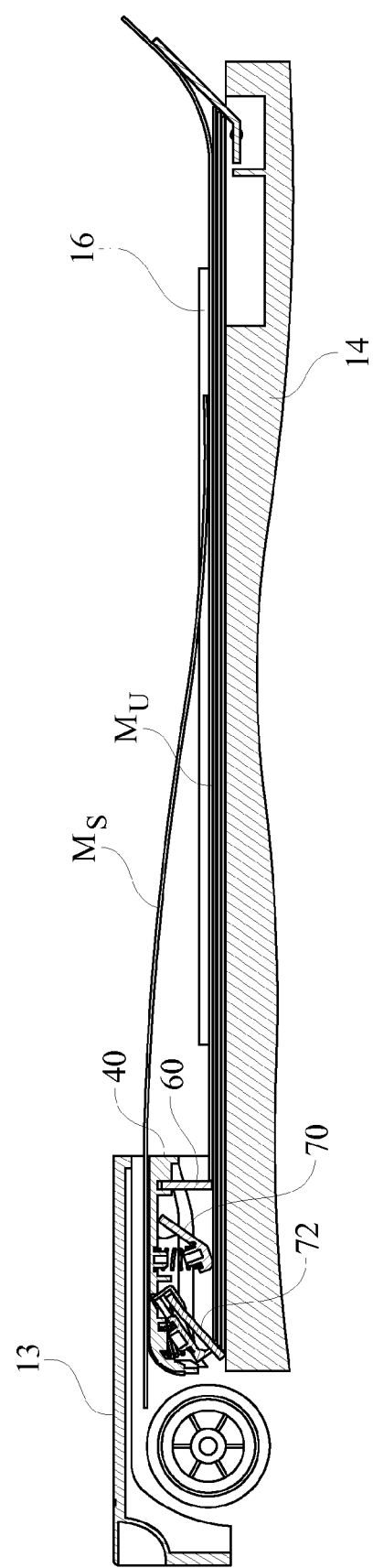
FIG. 6 is side-sectional views of the scanner portion of FIG. 2 illustrating how exited media normally depends from the exit tray onto the top of media being feed into the ADF without being re-ingested by the ADF; and, FIGS. 7 and 8 are side-sectional views of the scanner portion of FIG. 2 illustrating a sequence of how exited media is stopped from being re-ingested by the ADF.

Referring now to FIG. 6, a side view of the ADF scanner 13 is depicted. As the scanned and exited media $M_s$ extends from the scanner 13, the media leading edge depends from the exit tray 40 on to the unscanned media $M_u$ positioned on the lid 14. Depending on the length of media $M_s$ and the height of the exit tray 40 from the input tray 14, the exited and scanned media $M_s$ may fall on to the lid 14 when scanning is complete. As the unscanned media $M_u$ on the input tray 14 continues feeding into the ADF scanner 13, the scanned media $M_s$ is pulled toward the stopper 60. Upon engaging the stopper 60, the scanned media $M_s$ is inhibited from re-ingestion.

Figure 7:
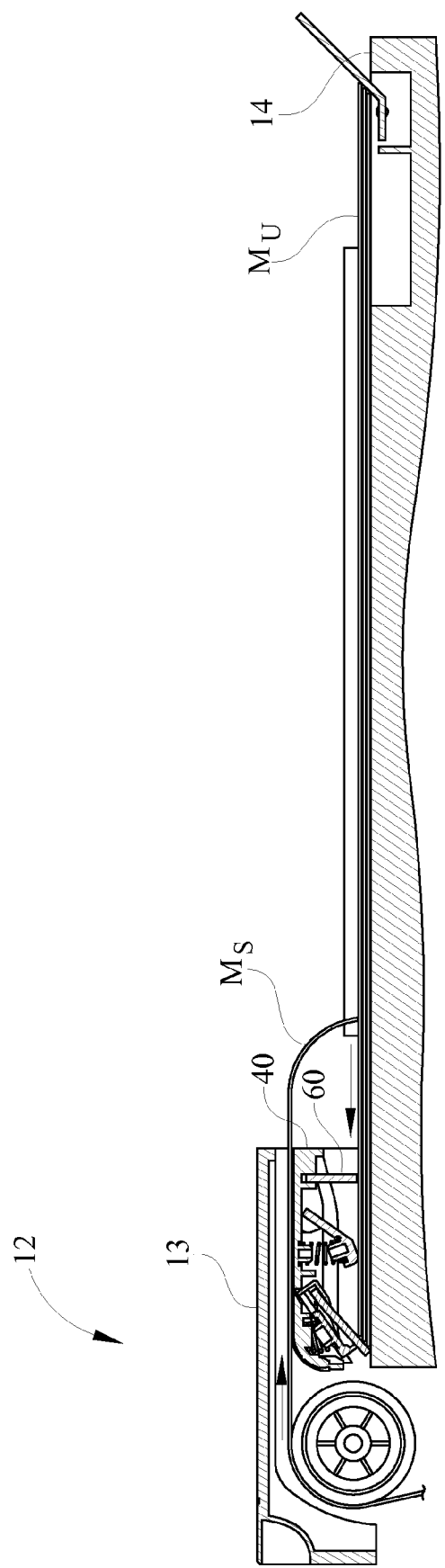
Figure 8:
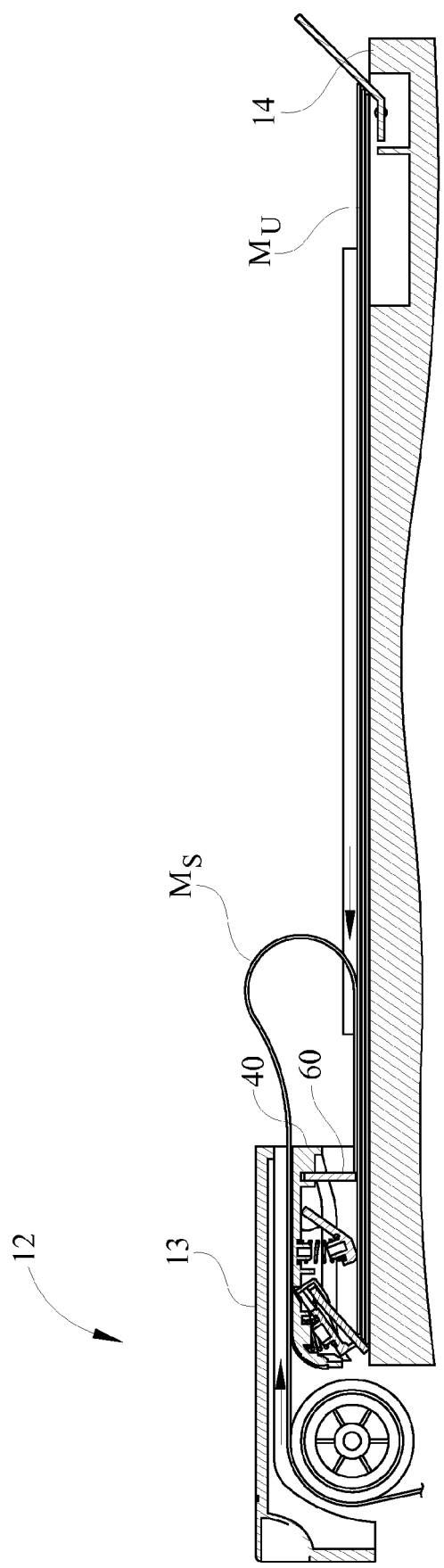

Referring now to FIGS. 7 and 8, side views of the ADF scanner and input tray 14 are depicted. In FIG. 7, unscanned media $M_u$ is located in the input tray 14 and feeding into the ADF scanner 13. As the exited scanned media sheet $M_s$ feeds through the ADF scanner 13, the leading edge of the exited media sheet $M_s$ extends from the exit tray 14 and sags onto the unscanned media $M_u$ positioned on the input tray 14. As the trailing edge of the scanned media $M_s$ continues feeding and the media $M_u$ in the input tray 14 continues its bottom feed process, the trailing edge of the scanned media $M_s$ moves faster than the leading edge. At the same time, the unscanned media $M_u$ in the input tray 14 is slowly feeding into the ADF 13, but at a slower rate than the scanned media $M_s$ is feeding since the ADF 13 depicted is a bottom-feed system. Referring now to FIG. 8, the result of the trailing edge movement is depicted such that the exited and scanned media $M_s$ loops around as the sheets $M_u$ in the input tray 14 move forward and as the trailing edge of the scanned media $M_s$ continues feeding. As a result, the leading edge of the exited and scanned media $M_s$ engages the re-ingestion stopper 60. As the leading edge of the media stops movement due to its engagement with the stopper 60 and the trailing edge continues feeding through the scanner 13, the scanned media $M_s$ loops until the entire scanned media $M_s$ is ejected from the scanner 13.

In comparing FIG. 6 with FIGS. 7 and 8, the scanned media $M_s$ may feed from the scanner 13 and lay flat on the input tray 14 or unscanned media $M_u$, as shown in FIG. 6, or the scanned media $M_s$ may sag and engage the upper unscanned media in the tray 14 causing the exited and scanned media $M_s$ to fold under itself as shown in FIGS. 7 and 8. The action of the exited and scanned media $M_s$ depends in part upon the length, weight and thickness of the media. For example, longer lighter weight media will have a tendency to fold over itself as shown in FIGS. 7 and 8, whereas shorter heavier weight media, which is less likely to fold under itself, would tend to feed out and lay flat on the unscanned media $M_u$ or input tray 14, as shown in FIG. 6. As a result, in the movement shown in FIG. 6, the trailing edge changes its orientation to become the leading edge, relative to the ADF scanner 13 when the scanned media drops onto the uppermost media on the lid 14. Contrariwise, in the embodiments shown in FIGS. 7 and 8, the leading edge of the scanned media $M_s$ loops over so that the leading edge maintains its orientation as the leading edge. In either circumstance, the leading edge or the trailing edge of the exited media will engage the stopper 60 depending from the exit tray 40 so as to inhibit re-ingestion of the scanned media $M_s$. Therefore, the scanned media $M_s$ is not re-scanned through the ADF scanner 13 a second time. Thus, the stopper 60 will inhibit media re-ingestion regardless of how the scanned media $M_s$ exits the ADF scanner 13.

The foregoing description of structures and methods has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An auto-document feeder, comprising:
   an auto-document feeder having a lower input tray and an upper exit tray;
   said upper exit tray having a length which is shorter than a length of said input tray so that exiting media depends onto said input tray;
   a flexible stopper depending from said upper exit tray, said flexible stopper sized to inhibit said exiting media from being re-ingested by paper-to-paper friction during feeding of media into said input tray; and
   wherein said stopper is formed of an elastomeric material.

2. The auto-document feeder of claim 1 wherein said stopper is substantially T-shaped.

3. The auto-document feeder of claim 1 wherein said stopper has a flexibility which allows media to be inserted in said input tray but inhibits frictional pulling of exit media into a feeding area along said input tray.

4. The auto-document feeder of claim 1 wherein said auto-document feeder feeds media to a scanner.

5. The auto-document feeder of claim 1 wherein said auto-document feeder feeds media to a printer.

6. The auto-document feeder of claim 1, wherein a leading edge of exiting media rests on one of the input tray and input media disposed on the input tray.

7. An auto-document feeder, comprising:
   an auto-document feeder having an input tray and an exit tray;
   a stop device depending from said exit tray;
   said exit tray being substantially shorter than a media sheet, such that said media extends beyond said exit tray upon exiting and engages one of said media input tray and said media on said input tray;
   wherein said media exiting from said auto-document feeder indexes toward a feeding area and engages said stop device to inhibit said media from re-ingestion into said auto-document feeder; and
   wherein said stop is formed of elastomeric material.

8. The auto-document feeder of claim 7 wherein said stop depends substantially vertically from said exit tray.

9. The auto-document feeder of claim 7 wherein said exit tray is substantially shorter than said input tray.

10. The auto-document feeder of claim 7 wherein said exit tray is shorter than a media sheet.

11. The auto-document feeder of claim 7 wherein said auto-document feeder feeds a scanner.

12. The auto-document feeder of claim 7 wherein said auto-document feeder feeds a printer.

13. The auto-document feeder of claim 7, wherein a leading edge of exiting media rests on one of the input tray and input media disposed on the input tray.

14. An auto-document feeder, comprising:
   an auto-document feeder having an input tray and an exit tray;
   said exit tray having a length in a media feed direction which is less than a length of said input tray and having a cavity therein;
   a re-ingestion stopper received in said cavity and depending from said exit tray and extending in front of a feeding area and inhibiting re-ingestion of exited media; and
   wherein said stopper being formed of a flexible elastomeric material.

15. The auto-document feeder of claim 14 wherein said stopper is flexible enough to deflect when said media is inserted for initial feeding and stiff enough to inhibit re-ingestion of said exited media indexing from said exit tray to said input tray.

16. The auto-document feeder of claim 14 wherein said re-ingestion stopper is substantially T-shaped.

17. The auto-document feeder of claim 14 further comprising a gap disposed between said re-ingestion stopper and said input tray wherein media is positioned on said tray for an initial media feed.

18. The auto-document feeder of claim 14 wherein said auto-document feeder has a housing and said exit tray is contained within said housing.

19. The auto-document feeder of claim 14 wherein said exit tray is shorter than media passing through said ADF.

20. The auto-document feeder of claim 14, wherein a leading edge of exiting media rests on one of the input tray and input media disposed on the input tray.

\* \* \* \* \*